US012246430B2

(12) United States Patent
Ichikawa et al.

(10) Patent No.: US 12,246,430 B2
(45) Date of Patent: Mar. 11, 2025

(54) POWER TOOL INCLUDING VIBRATION ISOLATOR

(71) Applicant: MAKITA CORPORATION, Anjo (JP)

(72) Inventors: Naoto Ichikawa, Anjo (JP); Yoshitaka Machida, Anjo (JP); Taro Hisano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 42 days.

(21) Appl. No.: 18/142,628

(22) Filed: May 3, 2023

(65) Prior Publication Data

US 2023/0415323 A1 Dec. 28, 2023

(30) Foreign Application Priority Data

Jun. 24, 2022 (JP) ................................ 2022-102095

(51) Int. Cl.

| | |
|---|---|
| ***B25F 5/00*** | (2006.01) |
| ***B25D 11/04*** | (2006.01) |
| ***B25D 16/00*** | (2006.01) |

(52) U.S. Cl.

CPC .............. *B25F 5/006* (2013.01); *B25D 11/04* (2013.01); *B25D 16/006* (2013.01); *B25D 2250/011* (2013.01); *B25D 2250/095* (2013.01); *B25D 2250/265* (2013.01)

(58) Field of Classification Search

CPC ............ B25D 2250/121; B25D 16/006; B25D 2216/0084; B25D 2250/221; B25D 17/24; B25D 2216/0023; B25F 5/02; B25F 5/001; B25F 5/006; B25F 5/026

USPC ..... 173/48, 104, 162.2, 93.6, 216, 46, 162.1

See application file for complete search history.

(56) References Cited

U.S. PATENT DOCUMENTS

| | | | | |
|---|---|---|---|---|
| 4,995,094 A * | 2/1991 | Aio | .......................... | H02P 7/29 318/545 |
| 2017/0170769 A1 * | 6/2017 | Iwai | .......................... | H02P 6/16 |
| 2018/0345469 A1 * | 12/2018 | Tanabe | ................. | B25D 17/043 |

FOREIGN PATENT DOCUMENTS

| | | |
|---|---|---|
| JP | S61-37508 Y2 | 10/1986 |

* cited by examiner

*Primary Examiner* — Jacob A Smith

(74) *Attorney, Agent, or Firm* — Oliff PLC

(57) ABSTRACT

A power tool including a vibration isolator can be downsized in a relative movement direction and reduce damage to wiring. A hammer drill includes a front housing including an output unit and a motor, a rear housing separate from the front housing and including a switch to be movable relative to the front housing in a front-rear direction, a vibration isolator located between the front housing and the rear housing and including a coil spring, a lead wire electrically connecting the motor and the switch, and a lead wire holder holding a middle portion of the lead wire in a lateral direction.

16 Claims, 10 Drawing Sheets

POWER TOOL INCLUDING VIBRATION ISOLATOR

CROSS-REFERENCE TO RELATED APPLICATIONS

This application claims the benefit of priority to Japanese Patent Application No. 2022-102095, filed on Jun. 24, 2022, the entire contents of which are hereby incorporated by reference.

BACKGROUND

1. Technical Field

The present disclosure relates to a power tool, such as a hammer drill, including a vibration isolator.

2. Description of the Background

A known power tool, such as a hammer drill, includes a vibration isolator for reducing vibration transmitted to a hand of the operator gripping the housing. For example, Japanese Examined Utility Model Application Publication No. 61-37508 (hereafter, Patent Literature 1) describes a power tool including a housing accommodating a motor, and a handle grippable by the operator. The housing and the handle are connected with a vibration isolator in between in a manner movable relative to each other.

The power tool also includes a vibration-absorbing holder (wiring retainer) fixed to the housing parallel to the striking direction (relative movement direction) to prevent damage to wiring caused by bending when the housing and the handle are displaced in use. The wiring retainer holds the wiring parallel to the relative movement direction to allow the wiring to have an extra length.

BRIEF SUMMARY

In Patent Literature 1, the power tool includes the wiring retainer elongated in the relative movement direction. The power tool thus has an increased total length in the striking direction and may fail to be downsized.

One or more aspects of the present disclosure are directed to a power tool including a vibration isolator that can be downsized in a relative movement direction and reduce damage to wiring.

A first aspect of the present invention provides a power tool including a vibration isolator, the power tool including:

- a first assembly including an output unit and a first electric component;
- a second assembly separate from the first assembly and including a second electric component, the second assembly being movable relative to the first assembly in a predetermined linear direction;
- a vibration isolator between the first assembly and the second assembly, the vibration isolator including an elastic member;
- wiring electrically connecting the first electric component and the second electric component; and
- a wiring holder holding a part of the wiring in a direction intersecting with the linear direction.

The power tool including the vibration isolator according to the above aspect of the present disclosure can be downsized in the relative movement direction and reduce damage to wiring.

DETAILED DESCRIPTION

Embodiments of the present disclosure will now be described with reference to the drawings.

Figure 1:
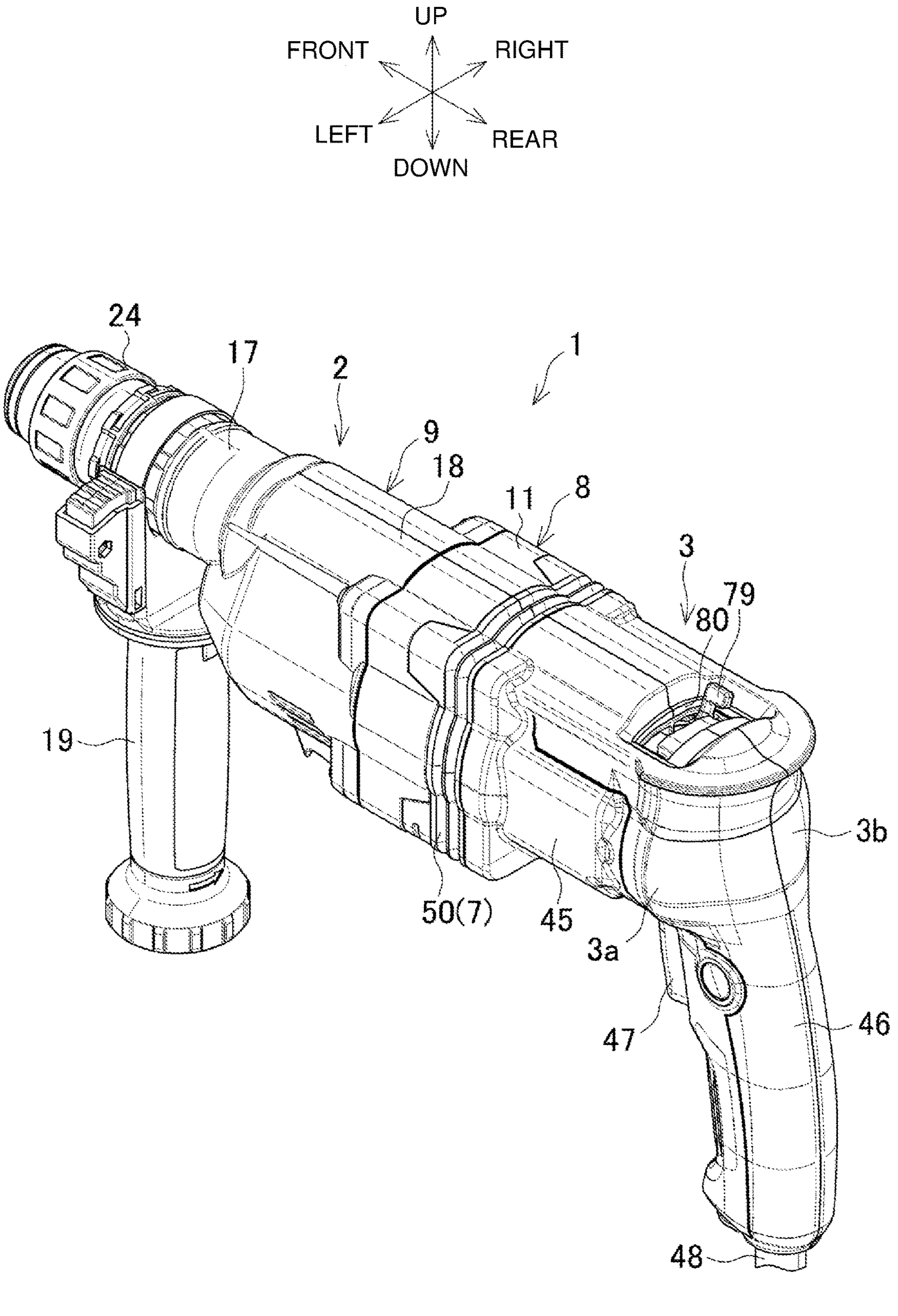
FIG. 1 is a rear perspective view of a hammer drill.
Figure 2:
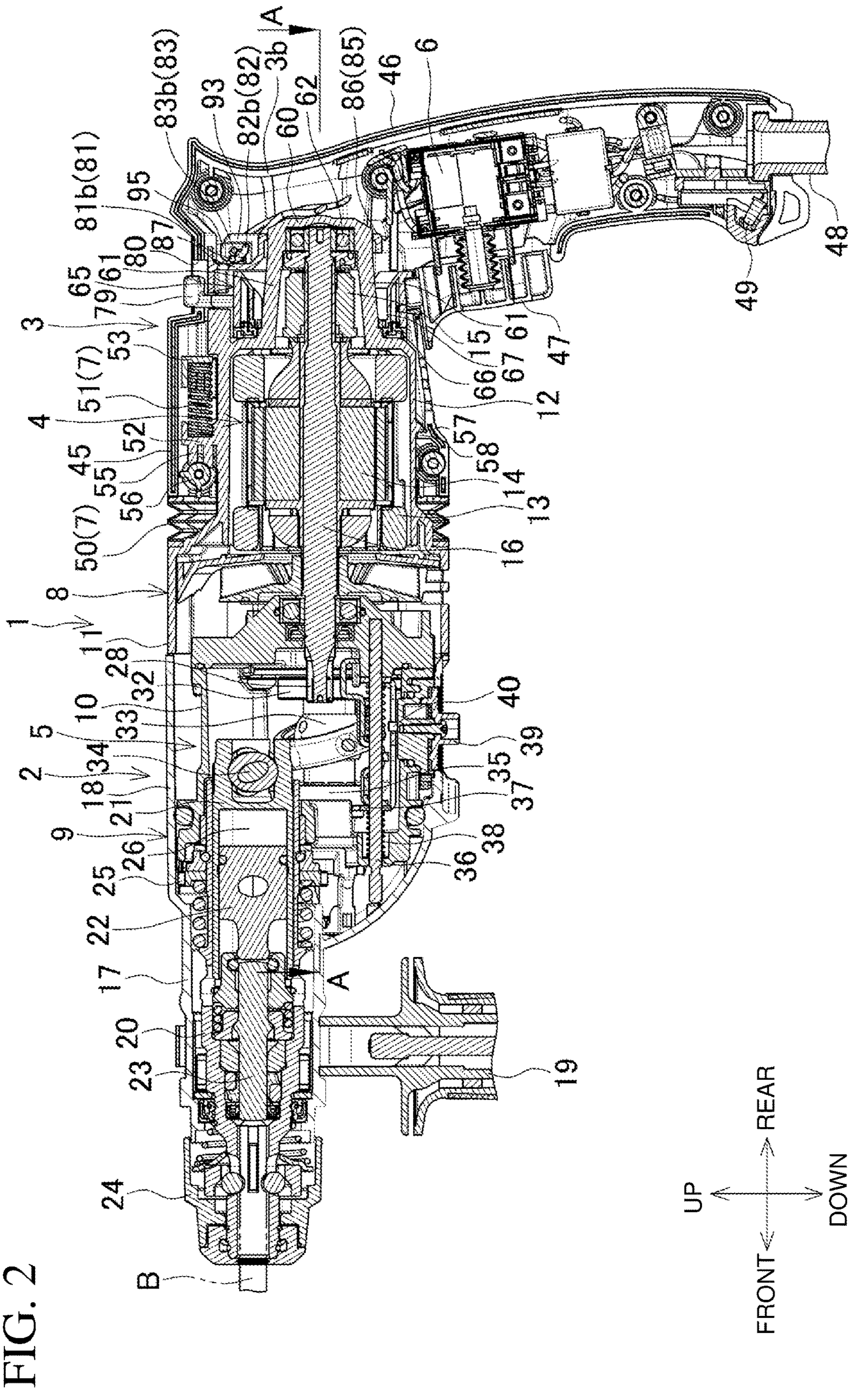
FIG. 2 is a longitudinal central sectional view of the hammer drill.

FIG. 1 is a sectional view of a hammer drill as an example of a power tool including a vibration isolator. FIG. 2 is a longitudinal central sectional view of the hammer drill.

A hammer drill 1 includes a front housing 2 and a rear housing 3. The front housing 2 accommodates a motor 4 and an output unit 5. The rear housing 3 accommodates a switch 6.

The front housing 2 and the rear housing 3 are movable relative to each other in the front-rear direction. A vibration isolator 7 (described later) is located between the front housing 2 and the rear housing 3.

The front housing 2 includes a motor housing 8, an outer housing 9, and an inner housing 10. The motor housing 8 includes a joint 11 at the front and a motor compartment 12 at the rear. The joint 11 is a rectangular prism fastened to the outer housing 9 with screws. The motor compartment 12 is a cylinder having a smaller diameter than the joint 11. The motor compartment 12 accommodates the motor 4.

The motor 4 includes a stator 13 and a rotor 14. The rotor 14 includes a commutator 15 and a rotational shaft 16. The motor 4 is accommodated in the motor compartment 12 with the rotational shaft 16 extending in the front-rear direction. The rotational shaft 16 extends through the joint 11 into the inner housing 10.

The outer housing 9 includes a front cylindrical portion 17 and a rear cylindrical portion 18. The front cylindrical portion 17 is a cylinder extending frontward with a circular cross section. The rear cylindrical portion 18 is a cylinder having a larger diameter than the front cylindrical portion 17. The joint 11 in the motor housing 8 is connected to the rear cylindrical portion 18. The front cylindrical portion 17 is, in an upper portion of the rear cylindrical portion 18, decentered from the rear cylindrical portion 18. A side handle 19 is attachable to the front cylindrical portion 17.

The output unit 5 includes a tool holder 20, a piston cylinder 21, a striker 22, and an impact bolt 23. The tool holder 20 is a cylinder accommodated coaxially in the front cylindrical portion 17. The tool holder 20 is held by the front cylindrical portion 17 and the inner housing 10 in a rotatable manner. The tool holder 20 has its front end protruding frontward from the front cylindrical portion 17. An operation sleeve 24 is located at the front end of the tool holder 20. The operation sleeve 24 is operable to attach and detach a bit B to and from the front end of the tool holder 20. A gear 25 is externally mounted on the tool holder 20 in the rear cylindrical portion 18.

The piston cylinder 21 has an opening in its front end. The piston cylinder 21 is accommodated in a rear portion of the tool holder 20 to be movable back and forth. The striker 22 is accommodated in the piston cylinder 21 with an air chamber 26 in between to be movable back and forth. The impact bolt 23 is accommodated in the tool holder 20 in front of the striker 22 to be movable back and forth.

Figure 3:
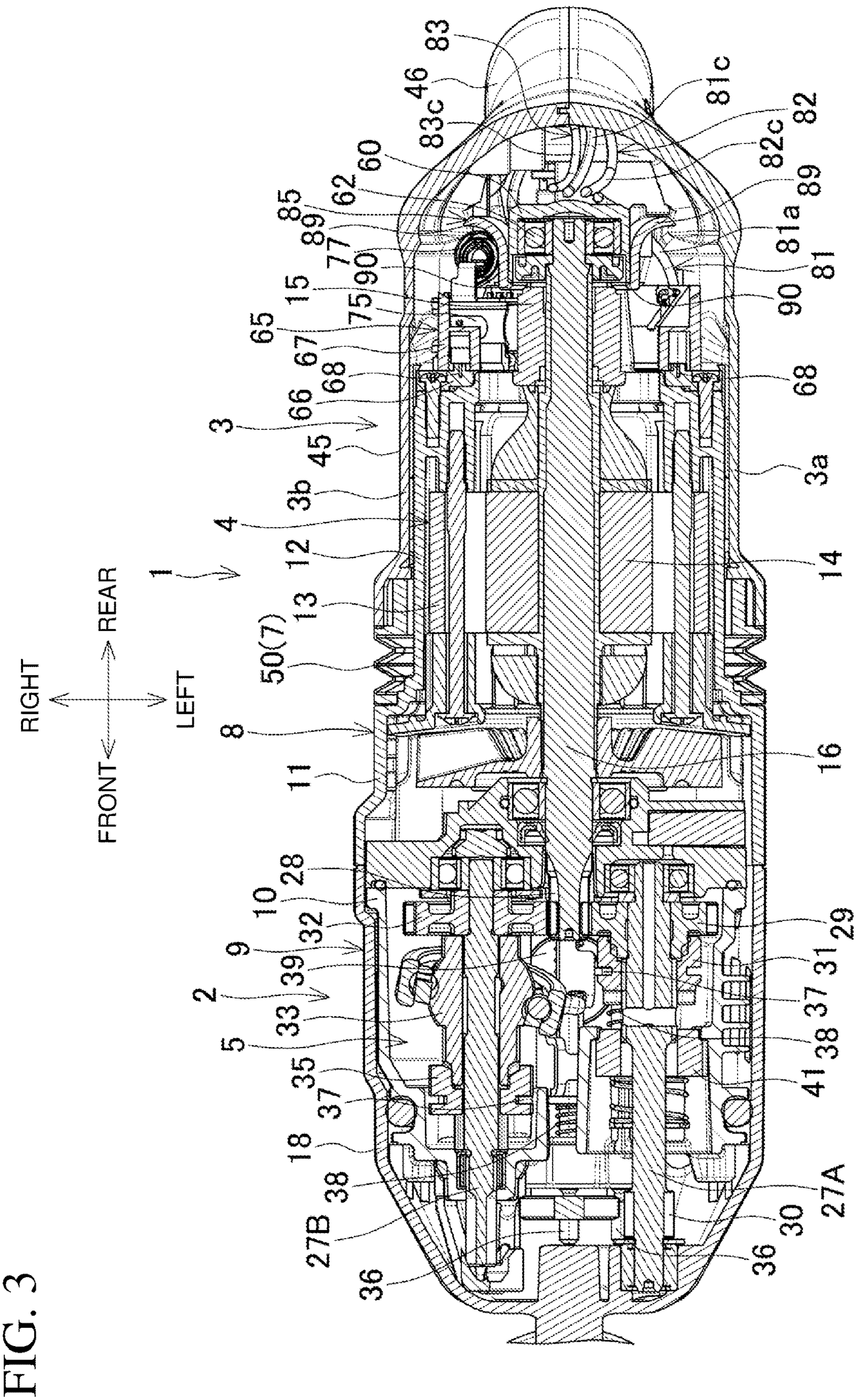
FIG. 3 is a sectional view taken along line A-A in FIG. 2.

In the output unit 5, as shown in FIG. 3, first and second countershafts 27A and 27B are located below the tool holder 20 and are rotatable. The first and second countershafts 27A and 27B are arranged laterally parallel to the tool holder 20. The rotational shaft 16 receives a pinion 28 on its front end. The rotational shaft 16 has the front end protruding between the first and second countershafts 27A and 27B.

The first countershaft 27A on the left receives a rotatable first gear 29 on its rear portion. The first gear 29 meshes with the pinion 28. The first countershaft 27A includes a second gear 30 on its front portion. The second gear 30 meshes with the gear 25 on the tool holder 20. A first clutch 31 is spline-connected to the first countershaft 27A in front of the first gear 29. The first clutch 31 engages with the first gear 29 at a retracted position. Rotation of the first gear 29 is thus transmitted to the first countershaft 27A through the first clutch 31. When the first clutch 31 moves forward and separates from the first gear 29, the rotation of the first gear 29 is not transmitted to the first countershaft 27A.

The second countershaft 27B on the right receives a rotatable third gear 32 on its rear portion. The third gear 32 meshes with the pinion 28. In front of the third gear 32, a boss sleeve 33 is, as a separate component, externally attached to the second countershaft 27B in a rotatable manner. The boss sleeve 33 includes an arm 34 protruding upward with a swash bearing having its axis tilted in between. The distal end of the arm 34 is connected to the rear end of the piston cylinder 21.

A second clutch 35 is spline-connected to the second countershaft 27B in front of the boss sleeve 33. The second clutch 35 engages with the boss sleeve 33 at a retracted position. Rotation of the second countershaft 27B is thus transmitted to the boss sleeve 33 through the second clutch 35. When the second clutch 35 moves forward and separates from the boss sleeve 33, the rotation of the second countershaft 27B is not transmitted to the boss sleeve 33.

Two rods 36, or right and left rods 36, are arranged parallel to each other below the first and second countershafts 27A and 27B. The left rod 36 includes a plate 37 engaged with the first clutch 31 to be movable back and forth. The right rod 36 includes a plate 37 engaged with the second clutch 35 to be movable back and forth. Each plate 37 is urged backward by a coil spring 38. The first and second clutches 31 and 35 engaged with the plates 37 are thus each urged to the retracted position in a normal state.

The position of each plate 37 may be changeable with a switching knob 39. The switching knob 39 is located on the lower surface of the rear cylindrical portion 18 to be operable by rotating. The switching knob 39 includes two eccentric pins 40 protruding upward. In FIG. 2, a single eccentric pin 40 is shown. Each eccentric pin 40 engages with the corresponding plate 37 from the rear.

The switching knob 39 is rotated to switch the plate 37 between a front position and a rear position through the eccentric pin 40. In other words, the operator can select a drill mode, a hammer drill mode, a neutral mode, or a hammer mode by switching the positions of the first and second clutches 31 and 35 between the front position and the rear position. The first countershaft 27A receives a lock ring 41 in front of the first clutch 31. The lock ring 41 engages with the first clutch 31 at a forward position to restrict rotation of the first clutch 31.

The rear housing 3 includes a pair of left and right half housings 3*a* and 3*b*. The half housings 3*a* and 3*b* are joined together with multiple screws placed from the right. The rear housing 3 includes an outer cylinder 45 on its front. The outer cylinder 45 covers the motor compartment 12 from the rear. The front end of the outer cylinder 45 has the same outer shape as the joint 11 in the motor housing 8. The outer cylinder 45 includes a rear portion integral with a handle 46. The handle 46 extends downward. The handle 46 accommodates the switch 6. A trigger 47 protrudes frontward from the handle 46. The switch 6 is connected to a power cord 48. The power cord 48 extends from the lower end of the handle 46. A light 49 is located at the lower end of the handle 46 below the switch 6. The light 49 can illuminate an area ahead of the tool holder 20.

The vibration isolator 7 includes a rubber sleeve 50 and coil springs 51.

Figure 4:
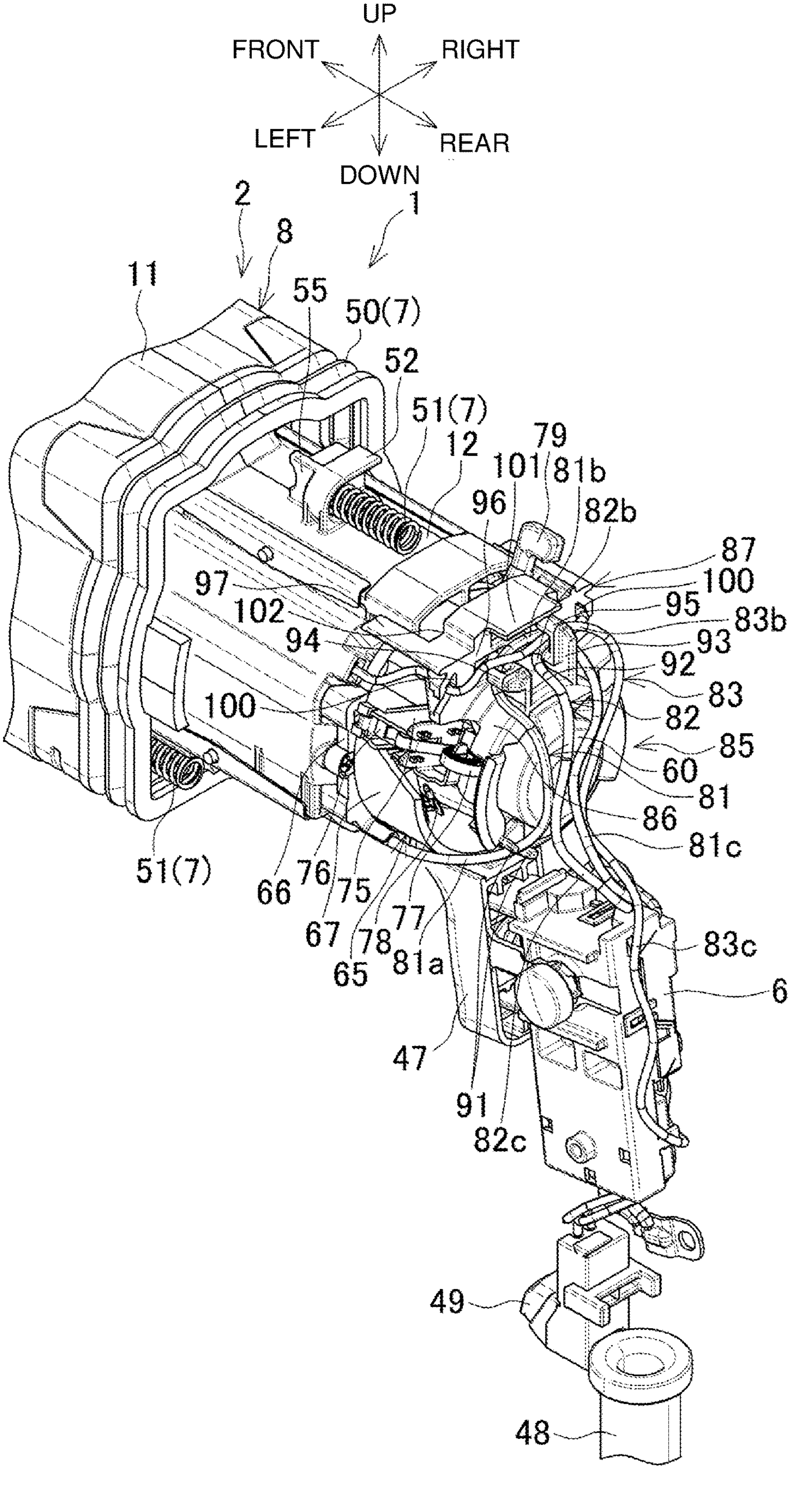
FIG. 4 is a rear perspective view of the hammer drill without showing a rear housing.
Figure 5:
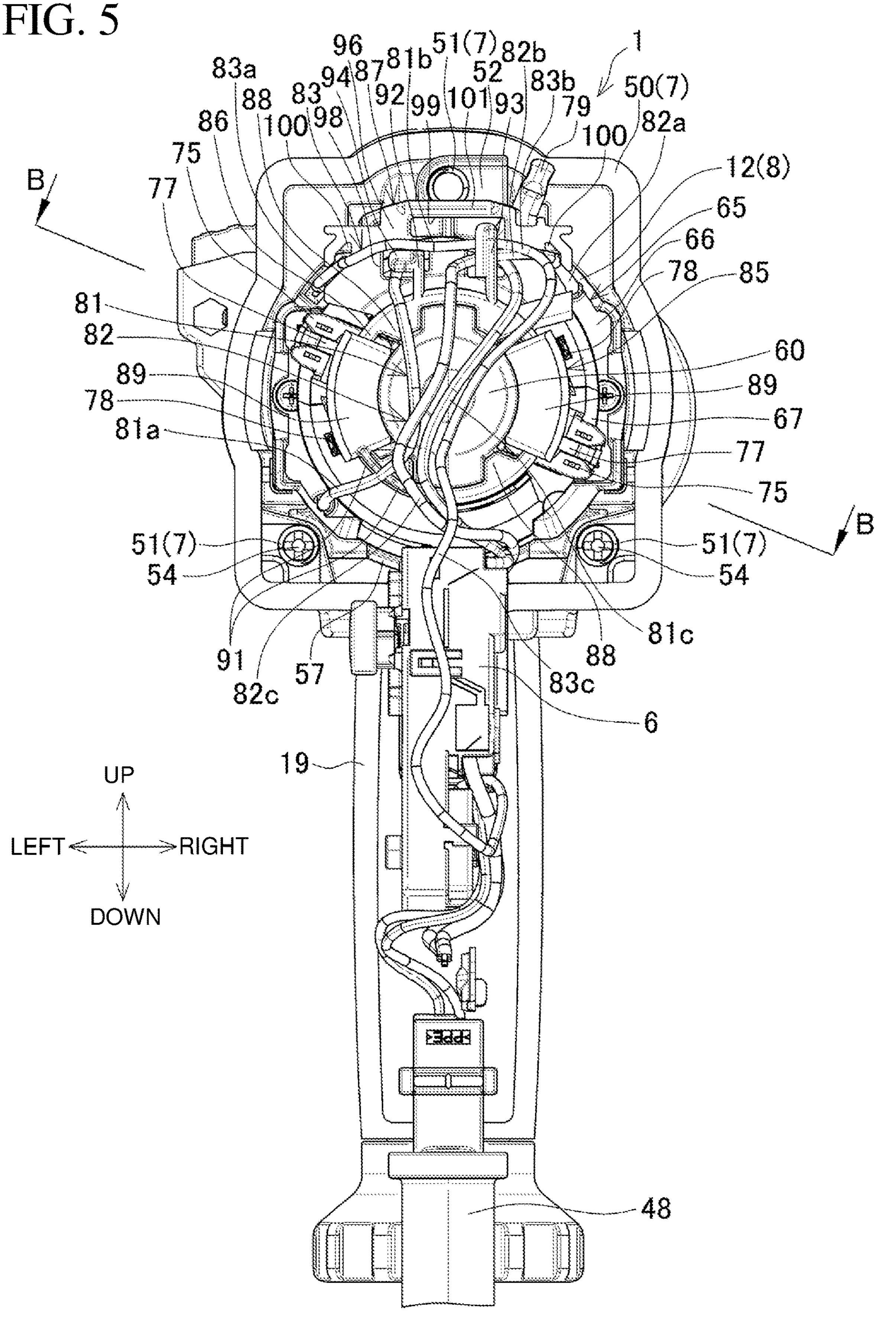
FIG. 5 is a rear view of the hammer drill without showing the rear housing.

The rubber sleeve 50 is located between the joint 11 in the motor housing 8 and the outer cylinder 45 in the rear housing 3. The rubber sleeve 50 is a bellows-like rectangular prism as shown in FIGS. 4 and 5. The rubber sleeve 50 has its front end engaged with the rear end face of the joint 11. The rubber sleeve 50 has its rear end engaged with the front end face of the outer cylinder 45.

The rubber sleeve 50 closes the entire circumference between the front housing 2 and the rear housing 3. The rubber sleeve 50 expands and contracts in the axial direction as the front housing 2 and the rear housing 3 relatively move back and forth.

The coil springs 51 are located between the motor compartment 12 and the outer cylinder 45 in the rear housing 3. A single coil spring 51 is located above the motor compartment 12. Two coil springs 51, which are right and left coil springs, are located below the motor compartment 12.

The motor compartment 12 includes, on its upper surface, a front reception plate 52 extending in the lateral direction. The outer cylinder 45 includes, on its inner surface behind the front reception plate 52, a rear reception plate 53 extending in the lateral direction. The upper coil spring 51 is located between the front reception plate 52 and the rear reception plate 53 in the front-rear direction.

A pair of left and right front spring receivers 54 is located on the rear surface of the joint 11 below the motor compartment 12. A pair of left and right rear spring receivers (not shown) is located on the inner surface of the outer cylinder 45 behind the front spring receivers 54. The two lower coil springs 51 are each located between the corresponding front spring receiver 54 and the rear spring receiver in the front-rear direction.

The front housing 2 and the rear housing 3 are urged in the front-rear direction to be apart from each other by the rubber sleeve 50 and the three coil springs 51. However, at a retracted position at which the rear housing 3 is apart from the front housing 2, an upper stopper 55 is in contact with a screw boss 56 as shown in FIG. 2. The upper stopper 55 protrudes frontward from the front reception plate 52. The screw boss 56 protrudes rightward from the left half housing 3*a*. A rear rib 57 is in contact with a front rib 58 below the motor compartment 12. The rear rib 57 protrudes downward from the motor compartment 12 and extends in the lateral direction. The front rib 58 protrudes upward from the inner surface of the outer cylinder 45 in front of the rear rib 57 and extends in the lateral direction. The rear housing 3 is thus urged to the retracted position in FIG. 2 at which the upper stopper 55 is in contact with the screw boss 56 and the rear rib 57 is in contact with the front rib 58 in a normal state.

Figure 6:
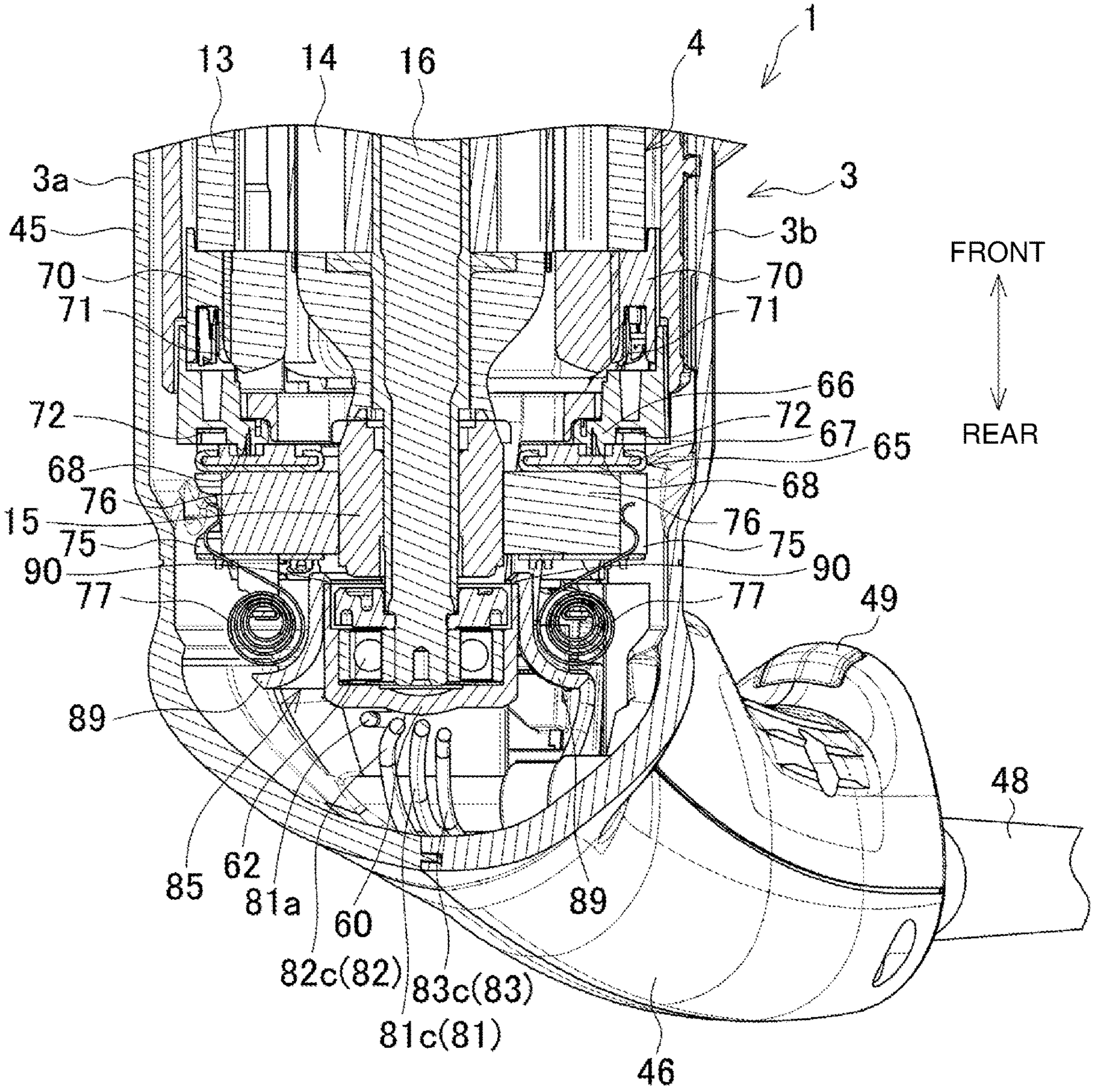
FIG. 6 is a sectional view taken along line B-B in FIG. 5.
Figure 7:
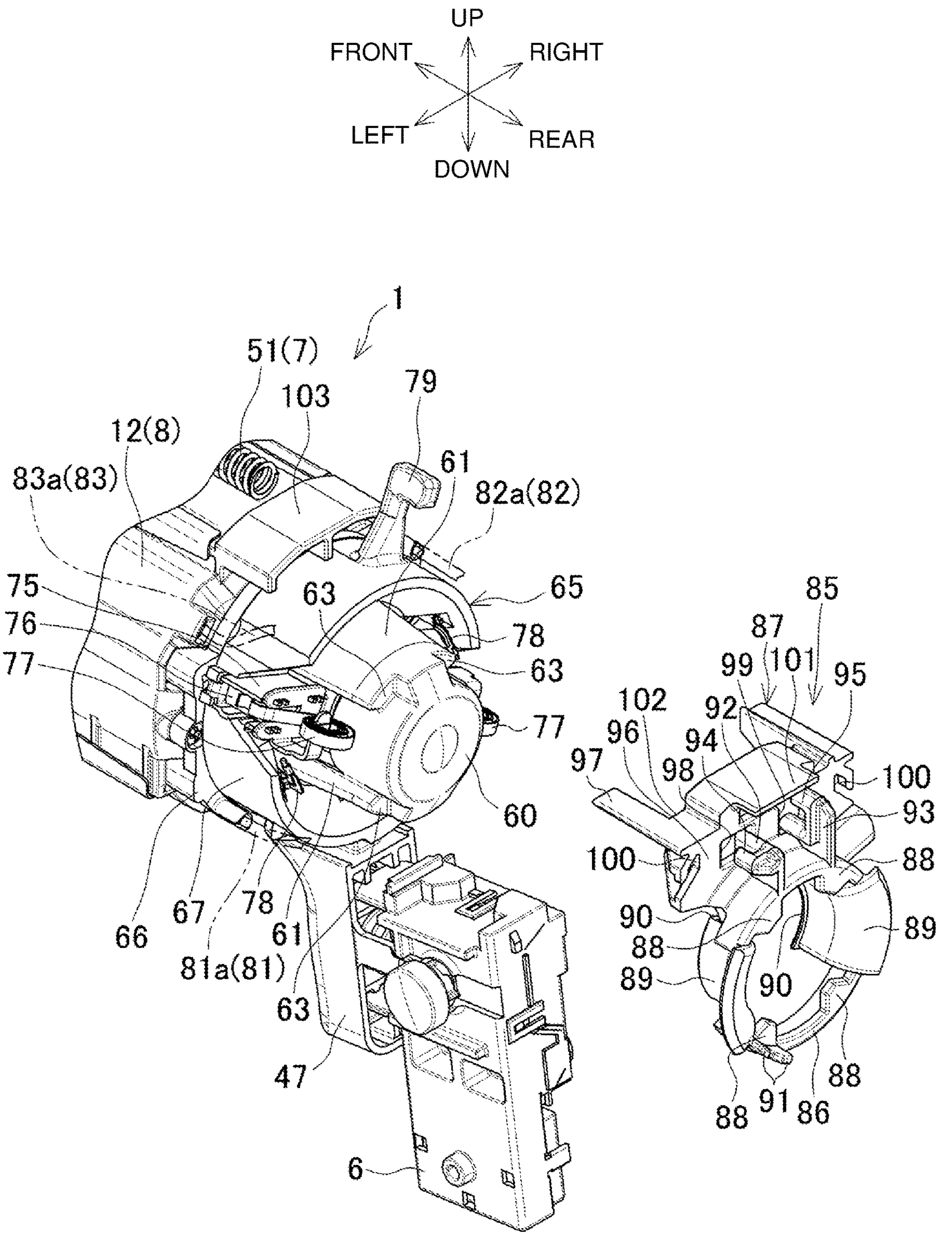
FIG. 7 is an exploded perspective view of a bearing retainer and a lead wire holder.

As also shown in FIGS. 6 and 7, a bearing retainer 60 is located behind the motor compartment 12. The bearing retainer 60 has a smaller diameter than the motor compartment 12 and serves as a cap with an opening at the front. The bearing retainer 60 is coaxially connected to the rear surface of the motor compartment 12 with upper and lower arms 61 extending in the front-rear direction. The bearing retainer 60 holds a bearing 62 on its rear inner surface to support the rear end of the rotational shaft 16. The arms 61 are concentric arcs about the axis of the rotational shaft 16. The commutator 15 in the rotor 14 is exposed on the left and right between the arms 61. The rear end of each arm 61 has a pair of steps 63. Each step 63 is recessed frontward from the rear surface of the bearing retainer 60.

A forward-reverse switch unit 65 is attached to the rear surface of the motor compartment 12. The forward-reverse switch unit 65 includes a unit base 66 and a brush base 67.

The unit base 66 is a disk coaxially fastened to the motor compartment 12 with screws at two positions, or on the left and right, from the rear. The unit base 66 includes a pair of stationary contacts 68 as shown in FIGS. 3 and 6. The stationary contacts 68 are arc-shaped as viewed from the rear. The stationary contacts 68 are point-symmetric to each other about the axis of the unit base 66.

An insulator on the rear of the stator 13 in the motor 4 includes four terminal retainers 70. Each terminal retainer 70 receives a terminal 71. The unit base 66 receives four connection terminals 72. Each connection terminal 72 is electrically connected to the corresponding terminal 71. Of the four connection terminals 72, a pair of connection terminals 72 located diagonally as viewed from the rear view is integral with the corresponding stationary contacts 68.

The brush base 67 is coaxially attached to the rear surface of the unit base 66 in a rotatable manner. The brush base 67 is a short cylinder. The brush base 67 includes a pair of brush holders 75 located point-symmetric in the radial direction. Each brush holder 75 accommodates a carbon brush 76. The carbon brush 76 is urged toward the axis of the brush base 67 by a spiral spring 77 in the brush holder 75 and presses the commutator 15 through a space between the arms 61.

The brush base 67 receives a pair of movable contacts 78 (FIG. 7). The movable contacts 78 are electrically connected to the carbon brushes 76. The movable contacts 78 are located on the same circle as the stationary contacts 68 in the unit base 66. The movable contacts 78 can be in and out of contact with the stationary contacts 68 as the brush base 67 rotates.

An operation projection 79 is located on the upper circumferential surface of the brush base 67. The operation projection 79 protrudes radially outward from the brush base 67. The operation projection 79 extends through a window 80 in the upper surface of the rear housing 3 and is exposed upward.

The forward-reverse switch unit 65 is externally operable to rotate the brush base 67 with the operation projection 79. As the brush base 67 rotates, the movable contacts 78 come in contact or come out of contact with the stationary contacts 68 to switch the direction in which a current flows. This switches the rotation direction of the rotor 14. In other words, the brush base 67 is switchable between a forward rotational position, a reverse rotational position, and a neutral position. At the frontward rotational position, the movable contacts 78 are in contact with the stationary contacts 68 in the frontward rotational direction. At the reverse rotational position, the movable contacts 78 are in contact with the stationary contacts 68 in the reverse rotational direction. At the neutral position between the forward and reverse rotational positions, the movable contacts 78 are out of contact with the stationary contacts 68.

The stator 13 and the switch 6 are electrically connected with three lead wires, or lead wires 81, 82, and 83, as shown in FIGS. 4 and 5. Two lead wires 81 and 82 are connected to a pair of connection terminals 72 including no stationary contacts 68 and extend from the unit base 66. A single lead wire 83 is connected to the connection terminal 72 including the stationary contact 68 (a connection terminal connected to the terminal 71 in the terminal retainer 70 on the upper left in FIG. 6) and extends from the motor compartment 12. Each of the lead wires 81 to 83 is held at the rear of the motor compartment 12 with a lead wire holder 85 attached to the bearing retainer 60.

As shown in FIG. 7, the lead wire holder 85 includes a ring 86 and a support plate 87.

The ring 86 is annular and has an inner diameter larger than the diameter of the bearing retainer 60. The ring 86 includes upper and lower pairs of engaging tabs 88 on its inner circumferential surface. The upper pair of engaging tabs 88 engages with the upper steps 63 on the corresponding arm 61. The lower pair of engaging tabs 88 engages with the lower steps 63 on the corresponding arm 61. The ring 86 includes a pair of left and right fitting tabs 89 fitted into the bearing retainer 60. The fitting tabs 89 are arc-shaped plates that flare radially outward toward the rear from the front end fitted into the bearing retainer 60. Each fitting tab 89 includes, along its circumferential front end, a hook 90 protruding inward. The hooks 90 engage with the front end of the bearing retainer 60 from the front and restrict the ring 86 from moving backward. The ring 86 includes, on its front surface below the fitting tab 89, a pair of clamping tabs 91 protruding rearward.

On the upper surface of the ring 86, a first retainer 92 and a second retainer 93 are arranged laterally. The first retainer 92 is a plate extending in the front-rear direction and protruding upward. A first engagement tab 94 integral with the upper end of the first retainer 92 extends laterally. The first engagement tab 94 is L-shaped as viewed in plan and protrudes leftward.

The second retainer 93 is a plate on the right of the first retainer 92. The second retainer 93 extends in the front-rear direction and protrudes upward. A second engagement tab 95 integral with the front end of the second retainer 93 extends frontward. The second engagement tab 95 is C-shaped as viewed laterally with a cutout that is open frontward at the middle in the vertical direction.

The support plate 87 includes a vertical plate 96 and a lateral plate 97. The vertical plate 96 extends upward from the upper rear end of the ring 86 in front of the first and second retainers 92 and 93. The lateral plate 97 extends frontward from the upper end of the vertical plate 96. The vertical plate 96 has a first opening 98 in front of the first retainer 92. The first opening 98 is rectangular as viewed from the rear. The vertical plate 96 has a second opening 99 in front of the second retainer 93. The second opening 99 is inverted L-shaped as viewed from the rear.

The vertical plate 96 has a pair of right and left engagement grooves 100. The engagement grooves 100 are obliquely cut upward toward the middle in the lateral direction from the edges of the vertical plate 96, and then cut directly upward.

The lateral plate 97 includes, at the middle in the lateral direction, an overhang 101 protruding rearward. The overhang 101 is located above the first and second retainers 92 and 93 in a contactless manner. The lateral plate 97 has, in a front portion and at the middle in the lateral direction, a cutout 102 that is open frontward.

To attach the lead wire holder 85, the engaging tabs 88 are aligned with the corresponding steps 63 to allow the ring 86 to fit into the bearing retainer 60 from the rear. The bearing retainer 60 then fits between the fitting tabs 89, and the hook 90 is engaged with the front end of the bearing retainer 60. This prevents the lead wire holder 85 from slipping off backward.

The lateral plate 97 is located above the brush base 67. The motor compartment 12 includes, on its upper surface, a protrusion 103 protruding rearward. With the lead wire holder attached, the protrusion 103 fits into a front portion of the cutout 102 in the lateral plate 97 to cover the front of the cutout 102. The operation projection 79 on the brush base 67 extends through the cutout 102 and protrudes upward behind the protrusion 103.

Figure 8:
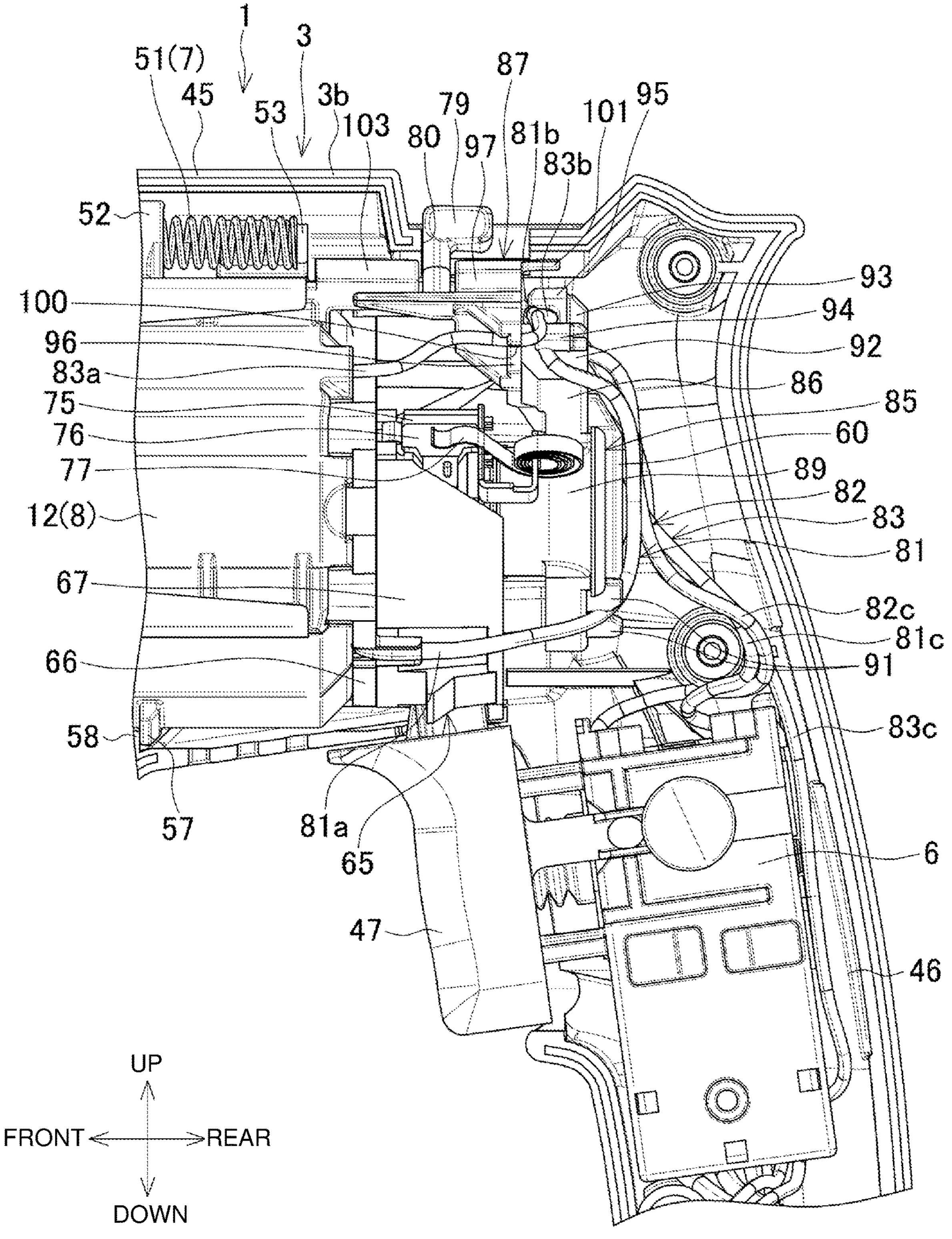
FIG. 8 is a right rear side view of the hammer drill with a left housing half removed.

As shown in FIGS. 4, 5 and 8, the lead wire 81 has a starting end 81*a* extending rearward from the unit base 66 outside the brush base 67. The lead wire 81 is then held between the clamping tabs 91 on the lead wire holder 85. The lead wire 81 held between the clamping tabs 91 extends upward behind the bearing retainer 60 with slack. The lead wire 81 has a middle portion 81*b* engaged with the first engagement tab 94 on the first retainer 92 from below. The middle portion 81*b* engaged with the first engagement tab 94 extends rightward from the first retainer 92 and is engaged with the second engagement tab 95 on the second retainer 93 from the left. Although the vertical plate 96 is located in front of the first and second engagement tabs 94 and 95, the first and second openings 98 and 99 allow smooth engagement of the lead wire 81. After the lead wire 81 is routed, the vertical plate 96 restricts the middle portion 81*b* from moving forward.

Figure 9:
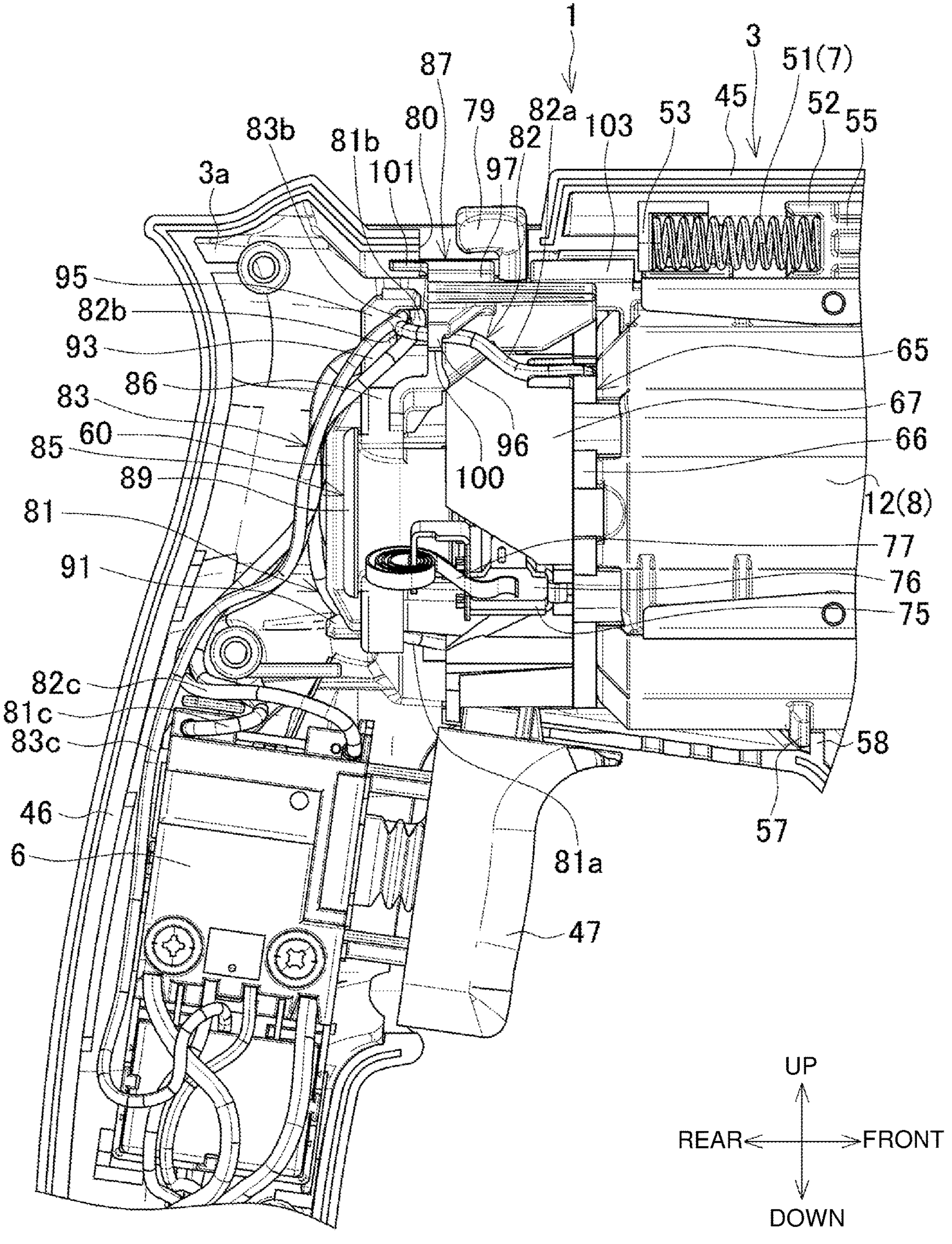
FIG. 9 is a left rear side view of the hammer drill with a right housing half removed.

The lead wire 81 extending rightward from the second engagement tab 95 is routed downward behind the bearing retainer 60. As also shown in FIG. 9, the lead wire 81 has a terminal end 81*c* connected to the switch 6. In other words, the lead wire 81 extends from below the axis of the motor compartment 12, and the middle portion 81*b* is held above the axis by the lead wire holder 85 in the lateral direction. The lead wire 81 is then routed below the axis again and connected to the switch 6.

As shown in FIG. 9, the lead wire 82 has a starting end 82*a* extending rearward from the unit base 66 outside the brush base 67. The lead wire 82 is then engaged with the right engagement groove 100 on the vertical plate 96 in the lead wire holder 85 from the front. As also shown in FIGS. 4 and 5, the lead wire 82 engaged with the engagement groove 100 extends rearward and then is routed leftward with a middle portion 82*b* being slacked. The middle portion 82*b* is then engaged with the second engagement tab 95 on the second retainer 93 from the right and extends to the left of the second engagement tab 95. The second opening 99 allows smooth engagement of the middle portion 82*b*. The vertical plate 96 restricts the middle portion 82*b* from moving forward.

The lead wire 82 extending from the second engagement tab 95 is routed downward behind the bearing retainer 60. As also shown in FIG. 9, the lead wire 82 has a terminal end 82*c* connected to the switch 6. In other words, the lead wire 82 includes the middle portion 82*b* held by the lead wire holder 85 above the axis of the motor compartment 12 in the lateral direction. The lead wire 82 is then routed below the axis and connected to the switch 6.

As shown in FIGS. 4, 5 and 8, the lead wire 83 has a starting end 83*a* extending rearward from the motor compartment 12 outside the unit base 66. The lead wire 83 is then engaged with the left engagement groove 100 on the vertical plate 96 from the front. The lead wire 83 engaged with the engagement groove 100 extends rearward and then is routed rightward with a middle portion 83*b* being slacked. The middle portion 83*b* is then engaged with the second engagement tab 95 on the second retainer 93 from the left and extends to the right of the second engagement tab 95. The second opening 99 allows smooth engagement of the middle portion 83*b*. The vertical plate 96 restricts the middle portion 83*b* from moving forward.

The lead wire 83 extending rightward from the second engagement tab 95 is routed downward behind the bearing retainer 60. As also shown in FIG. 9, the lead wire 83 has a terminal end 83*c* connected to the switch 6. In other words, the lead wire 83 includes the middle portion 83*b* held by the lead wire holder 85 above the axis of the motor compartment 12 in the lateral direction. The lead wire 83 is then routed below the axis and connected to the switch 6.

Hammer Drill Operation

In the hammer drill 1, the switching knob 39 is switched to a drill mode. The first clutch 31 then moves to the retracted position. Rotation of the first gear 29 transmitted from the pinion 28 is thus transmitted to the first countershaft 27A through the first clutch 31. The rotation of the first countershaft 27A is transmitted to the tool holder 20 from the second gear 30 through the gear 25.

The second clutch 35 moves to a forward position. Rotation of the second countershaft 27B transmitted from the pinion 28 is thus not transmitted to the boss sleeve 33.

In response to the trigger 47 being pressed to turn on the switch 6, the motor 4 is driven and rotates the rotational shaft 16. The tool holder 20 is then rotated with the first countershaft 27A to rotate the bit B on the tip. The boss sleeve 33 does not rotate, and thus the hammer drill 1 does not perform a striking operation.

The switching knob 39 is switched to a hammer drill mode. The first clutch 31 then remains at the retracted position.

The second clutch 35 moves to the retracted position. The rotation of the second countershaft 27B is thus transmitted to the boss sleeve 33 through the second clutch 35.

Thus, in response to the trigger 47 being pressed to drive the motor 4, the tool holder 20 is rotated with the first countershaft 27A to rotate the bit B on the tip. The boss sleeve 33 is also rotated to swing the arm 34 back and forth. The piston cylinder 21 thus reciprocates. The striker 22 then reciprocates and strikes the bit B with the impact bolt 23.

The switching knob 39 is switched to a hammer mode. The first clutch 31 then moves to the forward position. The rotation of the first gear 29 is thus not transmitted to the first countershaft 27A. However, in response to the first clutch 31 being engaged with the lock ring 41, the tool holder 20 is restricted from rotating together with the first countershaft 27A.

The second clutch 35 remains at the retracted position. The rotation of the second countershaft 27B is thus transmitted to the boss sleeve 33 through the second clutch 35.

Thus, in response to the trigger 47 being pressed to drive the motor 4, the piston cylinder 21 reciprocates and the striker 22 strikes the bit B with the impact bolt 23. The tool holder 20 does not rotate.

When the switching knob 39 is switched to a neutral mode, the first clutch 31 moves to a middle position. At the middle position, the first clutch 31 is retracted to be separate from the lock ring 41 and does not engage with the first gear 29. This allows rotation of the tool holder together with the first countershaft 27A and allows the bit B to be adjustable at any angle about the axis.

Figure 10:
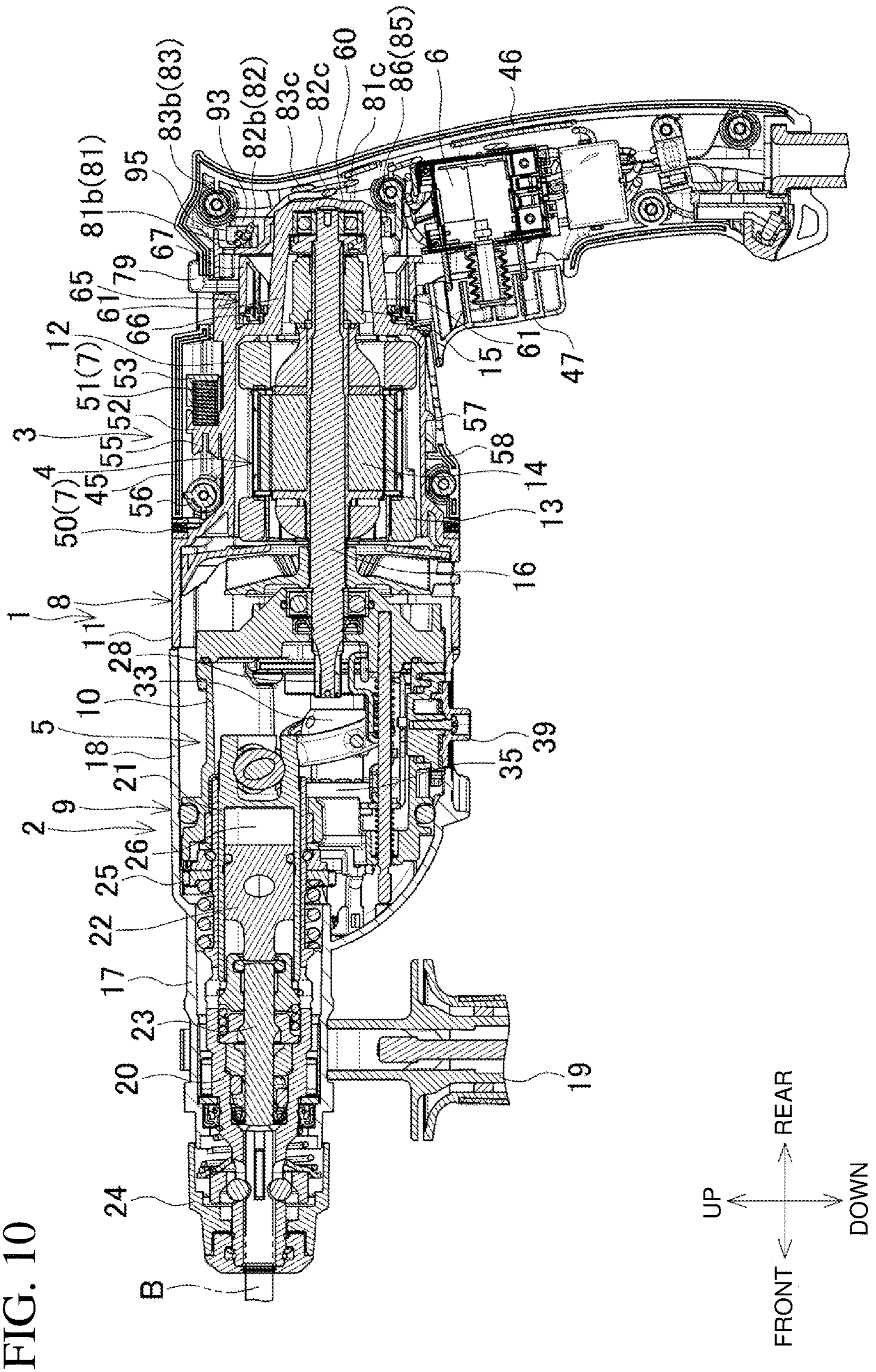
FIG. 10 is a longitudinal central sectional view of the hammer drill with the rear housing relatively advanced.

In use of the hammer drill 1 in each operation mode, the operator pushes the rear housing 3 forward with the hand gripping the handle 46. As shown in FIG. 10, the rear housing 3 then moves forward against an urging force from the coil springs 51 in the vibration isolator 7. This separates the screw boss 56 from the upper stopper 55 and separates the front rib 58 from the rear rib 57. Vibration generated in the output unit 5 or the motor compartment 12 in the front housing 2 is thus reduced by the coil springs 51 and is less likely to be transmitted to the rear housing 3. This reduces vibration transmitted to the hand of the operator gripping the handle 46 and reduces discomfort felt by the operator.

In this state, the bearing retainer 60 in the front housing 2 is relatively close to the handle 46 in the rear housing 3. However, the lead wires 81 to 83 are held in the lateral and vertical directions by the lead wire holder 85 behind the bearing retainer 60. The lead wires 81 to 83 thus do not interfere with the handle 46.

The lead wires 81 to 83 are connected between the motor compartment 12 with vibration and the switch 6 in the rear housing 3. The lead wires 81 to 83 may thus receive vibration from the motor compartment 12. However, the lead wires 81 to 83 are held by the lead wire holder 85 with the middle portions 81*b*, 82*b*, and 83*b* routed in the lateral direction with slack. The lead wires 81 to 83 are thus less likely to bend due to vibration. This effectively reduces damage to or degradation of the lead wires 81 to 83.

The lead wires 81 to 83 are held on the rear surface of the bearing retainer 60 apart from the left and right inner surfaces of the handle 46. This also prevents the lead wires 81 to 83 from being pinched between the lead wire holder 85 and the handle 46.

The hammer drill 1 according to the present embodiment includes the front housing 2 (first assembly) including the output unit 5 and the rear housing 3 (second assembly) separate from the front housing 2. The front housing 2 and the rear housing 3 are movable relative to each other in the front-rear direction (a predetermined relative movement direction). The vibration isolator 7 including the coil spring 51 (elastic member) is located between the front housing 2 and the rear housing 3. In the hammer drill 1, the motor 4 (first electric component) in the front housing 2 and the switch 6 (second electric component) in the rear housing 3 are electrically connected with the lead wires 81 to 83 (wiring).

The hammer drill 1 includes the lead wire holder 85 (wiring holder) holding the middle portions 81*b*, 82*b*, and 83*b* of the lead wires 81 to 83 (wiring) in the lateral direction (a direction intersecting with a linear direction).

This structure allows the lead wires 81 to 83 to have an extra length (slack) in the lateral direction for accommodating the stroke of relative movement between the front housing 2 and the rear housing 3. The hammer drill 1 including the front housing 2 and the rear housing 3 can thus remain smaller in the front-rear direction. This structure allows the hammer drill 1 to be downsized in the front-rear direction and prevents damage to the lead wires 81 to 83 due to vibration.

The output unit 5 includes the tool holder 20 (final output shaft) extending frontward. The linear direction is the front-rear direction, and the direction intersecting with the linear direction is the lateral direction.

The lead wires 81 to 83 are thus held in a space-saving manner.

The switch 6 is located below the axis (the middle in the vertical direction) of the motor compartment 12 in the front housing 2. The lead wire holder 85 is located above the axis of the motor compartment 12 in the front housing 2.

The lead wires 81 to 83 can have an extra length in the vertical direction as well.

The lead wire holder 85 is located frontward from the rearmost surface of the bearing retainer 60 (the rearmost surface of the first assembly) in the front housing 2.

With the hammer drill 1 including the lead wire holder 85, a wiring space can be reliably defined between the lead wire holder 85 and the rear housing 3.

The lead wire holder 85 is a separate member attached to the front housing 2.

The lead wire holder 85 can thus be easily included in a known front housing 2. The lead wire holder 85 is also easily replaceable.

The lead wire holder 85 is engaged with the bearing retainer 60 holding the bearing 62 supporting the rotational shaft 16.

The lead wire holder 85 is thus easily attachable using the bearing retainer 60, facilitating assembly. In addition, the lead wire holder 85 is more space-saving than screws for fastening and is less likely to affect downsizing.

The first electric component is the motor 4. The first assembly is the front housing 2 accommodating the motor 4. The second electric component is the switch 6. The second assembly is the rear housing 3 (housing) including the handle 46.

This effectively reduces damage to the lead wires 81 to 83 connecting the motor 4 and the switch 6.

The lead wires 81 and 82 are connected to the motor 4 with the forward-reverse switch unit 65 (rotation switcher) in the motor 4 in between.

This effectively prevents damage to the lead wires 81 and 82 during a switching operation of the forward-reverse switch unit 65.

The lead wire 81 connected to the motor 4 extends from below the axis of the motor compartment 12, is held by the lead wire holder 85 located above the axis, and is folded and connected to the switch 6 located below the axis.

This allows the lead wire 81 to have a sufficient extra length in the vertical direction and effectively prevents damage to the lead wire 81 due to vibration.

The clamping tabs 91 and the engagement grooves 100 (wire positioner) positioning the lead wires 81 to 83 are at positions different from the position of the lead wire holder 85.

This structure effectively prevents contact between the lead wires 81 to 83 and the brush holder 75 or other components.

Modifications of the present disclosure will now be described.

The positions and shapes of the first and second retainers in the lead wire holder is not limited to the embodiment. For example, the first and second retainers may be located in a lower portion of the lead wire holder rather than in an upper portion.

The first and second retainers may be located at the middle of the lead wire holder in the vertical direction (e.g., the right and left of the ring) to hold the lead wires in the lateral direction. In addition to the first and second retainers, another retainer may be included. Each engagement tab may extend in any direction and may have any shape as appropriate.

In the embodiment, the lead wire holder holds the middle portion of each lead wire in the lateral direction. However, the lead wire holder may hold the starting end or the terminal end of each lead wire in the lateral direction based on arrangement of the wiring. The lead wire holder may hold the starting end and the middle portion, or the middle portion and the terminal end of each lead wire in the lateral direction. The number of wires is not limited to three as in the embodiment.

The wire positioner is not limited to the clamping tabs or the engagement grooves in the embodiment. For example, the clamping tabs may protrude radially rather than rearward from the ring, or the engagement grooves may be cut from above. The wire positioner may be a separate component. The wire positioner may be eliminated.

The wiring holder may have a shape other than the shape of the lead wire holder in the embodiment. For example, the ring may be semicircular or U-shaped as viewed from the rear. The support plate may also eliminate the lateral plate when the support plate is not located above the ring.

The wiring holder is not limited to the structure in which the lead wire holder is engaged with the bearing retainer from the front as with the lead wire holder in the embodiment. The wiring holder may be engaged with the bearing retainer from the rear or from the side. The wiring holder may be attached to the bearing retainer with a structure other than a hook.

The wiring holder is not limited to the structure in which the lead wire holder is separate from the bearing retainer as with the lead wire holder in the embodiment. The wiring holder may be integral with the bearing retainer. However, the wiring holder may be located integrally or separately in an area other than the bearing retainer.

Although the wiring holder is located above the axis of the motor compartment and the second electric component is located below the axis in the embodiment, the arrangement may be vertically inverted as appropriate for the shape and the orientation of the handle. The wiring holder may be located on one of the left or right of the axis, and the second electric component may be located on the other of the left or right of the axis to allow the wires to have extra lengths.

The vibration isolator is not limited to the structure in the embodiment. The number and the positions of the coil springs may be changed as appropriate. An elastic member other than the coil spring may be used.

The rotation switcher for the motor is not limited to the forward-reverse switch unit in the above embodiment and may be changed as appropriate. For example, the operation projection may protrude from the side surface to be operable for switching.

The motor is not limited to a brushed motor but may be a brushless motor. The present disclosure is applicable to a structure without the rotation switcher.

The power source may be a battery pack in place of utility power.

The number of selectable operation modes is not limited to three. The switching tab may be at different positions as appropriate.

In the striking operation, the piston may reciprocate in the fixed cylinder rather than in the piston cylinder. The striker may directly strike the bit without the impact bolt. The striking operation may be performed using a crank assembly in place of the boss sleeve.

The two electric components connected with the wires are not limited to the motor and the switch in the embodiment. The two electric components may be, for example, a motor and a controller.

The power tool is not limited to the hammer drill in the embodiment. The present disclosure is applicable to any other power tool including a vibration isolator, such as an electric hammer or an electric drill.

REFERENCE SIGNS LIST

1 hammer drill
2 front housing
3 rear housing
4 motor
5 output unit
6 switch
7 vibration isolator
8 motor housing
9 outer housing
10 inner housing
11 joint
12 motor compartment
13 stator
14 rotor
16 rotational shaft
17 front cylindrical portion
18 rear cylindrical portion
20 tool holder
45 outer cylinder
46 handle
50 rubber sleeve
51 coil spring
60 bearing retainer
61 arm
65 forward-reverse switch unit
66 unit base
67 brush base
75 brush holder
81 to 83 lead wire
85 lead wire holder
86 ring
87 support plate
90 hook
91 clamping tab
92 first retainer
93 second retainer
94 first engagement tab
95 second engagement tab
96 vertical plate
97 lateral plate
100 engagement groove
B bit

What is claimed is:

1. A power tool including a vibration isolator, the power tool comprising:

a first assembly including an output unit and a first electric component;

a second assembly separate from the first assembly and including a second electric component, the second assembly being movable relative to the first assembly in a predetermined linear direction;

a vibration isolator between the first assembly and the second assembly, the vibration isolator including an elastic member;

wiring electrically connecting the first electric component and the second electric component;

a wiring holder holding a part of the wiring in a direction intersecting with the linear direction; and a bearing retainer holding a bearing supporting a rotational shaft, wherein the wiring holder is engaged with the bearing retainer.

2. The power tool according to claim 1, wherein the output unit includes a final output shaft extending frontward, the linear direction is a front-rear direction, and the direction intersecting with the linear direction is a lateral direction.

3. The power tool according to claim 2, wherein the second electric component is located on a first side of a middle of the first assembly in a vertical direction, and the wiring holder is located on a second side of the middle of the first assembly in the vertical direction.

4. The power tool according to claim 3, wherein the wiring connected to the first electric component extends from a portion of the first assembly on the first side, is held by the wiring holder located on the second side, and is folded and connected to the second electric component located on the first side.

5. The power tool according to claim 3, wherein the wiring holder is located frontward from a rearmost surface of the first assembly.

6. The power tool according to claim 3, wherein the wiring holder is a separate member attached to the first assembly.

7. The power tool according to claim 3, wherein the first electrical component is a motor, the first assembly is a housing accommodating the motor, the second electric component is a switch, and the second assembly is a housing including a handle.

8. The power tool according to claim 2, wherein the wiring holder is located frontward from a rearmost surface of the first assembly.

9. The power tool according to claim 8, wherein the wiring holder is a separate member attached to the first assembly.

10. The power tool according to claim 8, wherein the first electrical component is a motor, the first assembly is a housing accommodating the motor, the second electric component is a switch, and the second assembly is a housing including a handle.

11. The power tool according to claim 2, wherein the wiring holder is a separate member attached to the first assembly.

12. The power tool according to claim 11, wherein the first electrical component is a motor, the first assembly is a housing accommodating the motor, the second electric component is a switch, and the second assembly is a housing including a handle.

13. The power tool according to claim 2, wherein the first electrical component is a motor, the first assembly is a housing accommodating the motor, the second electric component is a switch, and the second assembly is a housing including a handle.

14. The power tool according to claim 1, wherein the first electrical component is a motor, the first assembly is a housing accommodating the motor, the second electric component is a switch, and the second assembly is a housing including a handle.

15. The power tool according to claim 14, further comprising:

a rotation switcher for the motor, wherein the wiring is connected to the motor with the rotation switcher in between.

16. The power tool according to claim 15, further comprising:

a wiring positioner positioning the wiring at a position different from a position of the wiring holder.

* * * * *